(12) United States Patent
Dampier

(10) Patent No.: US 8,254,559 B2
(45) Date of Patent: Aug. 28, 2012

(54) ROUTING INCIPIENT TRANSACTIONS BASED ON EXPERIENTIAL DATA

(75) Inventor: Todd O. Dampier, Menlo Park, CA (US)

(73) Assignee: Merced Systems, Inc., Redwood Shores, CA (US)

( * ) Notice: Subject to any disclaimer, the term of this patent is extended or adjusted under 35 U.S.C. 154(b) by 1292 days.

(21) Appl. No.: 11/956,123

(22) Filed: Dec. 13, 2007

(65) Prior Publication Data

US 2009/0154684 A1     Jun. 18, 2009

(51) Int. Cl.
*H04M 3/00* (2006.01)

(52) U.S. Cl. .......... 379/265.11; 379/265.06; 379/266.08

(58) Field of Classification Search ............ 379/265.06, 379/265.07, 265.08, 265.1, 265.11, 265.12, 379/265.13, 266.08
See application file for complete search history.

(56) References Cited

U.S. PATENT DOCUMENTS

| | | | |
|---|---|---|---|
| 6,292,555 B1 | 9/2001 | Okamoto | |
| 6,870,926 B2 | 3/2005 | Shambaugh et al. | |
| 6,978,006 B1 * | 12/2005 | Polcyn | 379/265.12 |
| 7,039,176 B2 | 5/2006 | Borodow et al. | |
| 7,133,520 B1 | 11/2006 | Doyle et al. | |
| 2002/0087385 A1 | 7/2002 | Vincent | |
| 2002/0131399 A1 | 9/2002 | Philonenko | |
| 2005/0135593 A1 * | 6/2005 | Becerra et al. | 379/220.01 |

FOREIGN PATENT DOCUMENTS

| | | |
|---|---|---|
| KR | 10-2004-0104097 | 12/2004 |
| KR | 10-2004-0104097 | 3/2007 |
| WO | WO 2003/013117 | 2/2003 |

OTHER PUBLICATIONS

U.S. Appl. No. 11/860,275, filed Sep. 24, 2007.
U.S. Appl. No. 11/615,694, filed Dec. 22, 2006.
U.S. Appl. No. 11/552,394, filed Oct. 24, 2006.
Search Report in correponding PCT Application PCT/US2008/086446, mailed Jun. 22, 2009.
Written Opinion in correponding PCT Application PCT/US2008/086446, mailed Jun. 22, 2009.

* cited by examiner

*Primary Examiner* — Antim Shah

(74) *Attorney, Agent, or Firm* — Pearl Cohen Zedek Latzer, LLP

(57) ABSTRACT

A method of routing a received incipient transaction to an organization entity includes processing experiential data of a fact collection regarding past transactions, including processing experiential data regarding past transactions involving an initiator of the incipient transaction and experiential data regarding transactions handled by organizational entities. At least one routing rule is evaluated in view of the experiential data processing, to make a routing determination. The incipient transaction is routed, for completion, to one of the organizational entities based on the routing determination. Furthermore, experiential data regarding completion of the incipient transaction, may be fed back to the fact collection.

12 Claims, 2 Drawing Sheets

ROUTING INCIPIENT TRANSACTIONS BASED ON EXPERIENTIAL DATA

TECHNICAL FIELD

The present invention is in the field of routing incipient incoming transactions to an organization entity according to routing rules evaluated based on experiential data of an initiator of the incipient transaction as well as experiential data of organizational entities.

BACKGROUND

It is known to categorize callers to call centers and, based on the categorization, route a call to a particular agent or groups of agents. For example, one rudimentary method to accomplish this is to provide different call in numbers to different classes of callers. For example, "gold" customers (e.g., for an airline, those who fly over a particular amount of miles or who spend over a particular amount of money) may be provided one call in number and other customers may be provided a different call in number.

As another example, callers may be initially provided a menu, where the menu item chosen dictates how the call is routed. These types of menus are familiar, such as "press 1 for technical support on home products; press 2 for technical support on small business products; press 3 for sales."

In some examples, agents are pre-classified within a call routing system, such that calls from a customer classified in a particular way (e.g., a "gold" customer) is automatically routed to an agent classified as one who deal with "gold" customers. This routing may occur based on discerned characteristics of the caller, without the caller having to take any particular action such as calling a special phone number or making a particular menu choice.

For example, calls may be routed to particular agents based on classifications of the agents by skill or by "split." For example, a particular agent may be an agent who can handle Spanish or English calls. Another example is an agent who is statically determined to deal with Platinum customers. Conventionally, such routing is encoded into advanced call distribution systems and is known as "skills-based routing."

There are some call routing systems in which dynamically route calls, such as described in U.S. Pat. No. 7,133,520. In U.S. Pat. No. 7,133,520, the dynamic routing is generally based on how occupied are particular agents at particular times.

SUMMARY

A method of routing a received incipient transaction to an organization entity includes processing experiential data of a fact collection regarding past transactions, including processing experiential data regarding past transactions involving an initiator of the incipient transaction and experiential data regarding transactions handled by organizational entities. At least one routing rule is evaluated in view of the experiential data processing, to make a routing determination. The incipient transaction is routed, for completion, to one of the organizational entities based on the routing determination. Furthermore, experiential data regarding completion of the incipient transaction, may be fed back to the fact collection.

DETAILED DESCRIPTION

Figure 1:
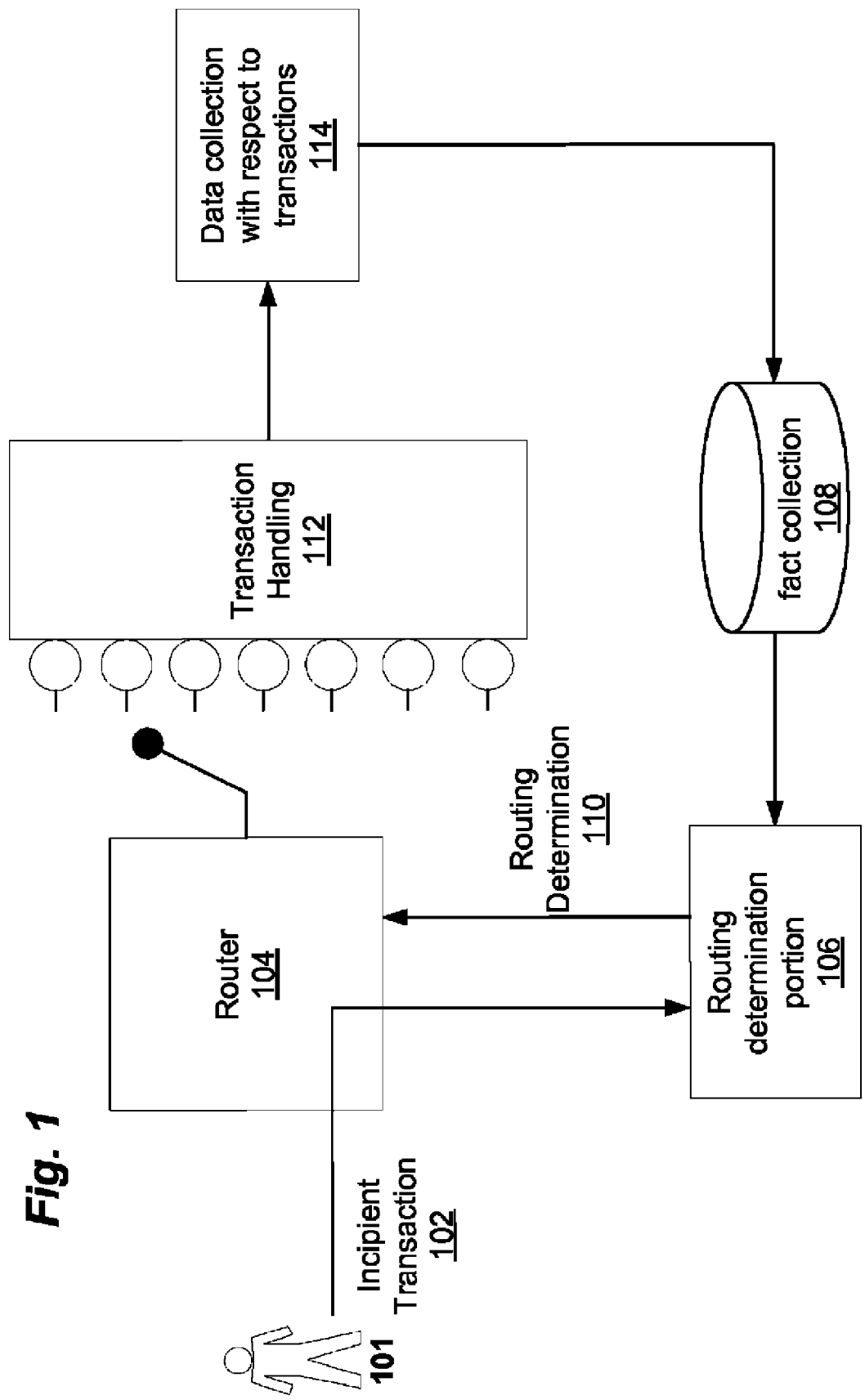
FIG. 1 schematically illustrates a system in which data regarding past transactions is used to automatically and dynamically inform the evaluation of routing rules, to optimize the routing of a particular incipient transaction (initiated by a transaction initiator) to an organizational entity.

The inventor has realized the desirability of using experiential data regarding past transactions, and associated with an initiator of an incipient transaction (meaning a transaction that is in an initial stage), to automatically and dynamically inform routing of the incipient transaction to an (such as to a particular agent, or even to a non-human entity). In this way, it is believed, the routing will efficiently optimize the chances of meeting the needs and/or desires of the transaction initiator. Experiential data regarding past transactions includes data of measurements of aspects of the past transactions and inferences that have been computed based on such data.

The experiential data may be held in some structured collection of facts, for example, held in records such as records of a relational database or of a dimensionally-modeled fact collection. The dimensionally-modeled fact collection may be implemented as a relational database, storing fact data in a manner that is accessible to users according to a ROLAP—Relational Online Analytical Processing—schema of fact and dimension tables. For example, a fact collection query 108 may originate as a database query, in some form which is processed into another form, for example, which is processed by an OLAP query engine into a fact collection query 108, presented as an SQL query that is understandable by the underlying relational database. These are just examples, however, and there are many other ways of representing and accessing a structured collection of facts of experiential data.

Before describing a system architecture and method, we first provide a simplified use case example. In the use case example, the incipient transaction is a phone call arriving at a call router. Based on caller ID information associated with the arriving phone call, it can be determined that the phone call is from Hank Ferguson.

Experiential data regarding transactions previously initiated by Hank Ferguson is accessed, and it is determined from that data that has called three times in the last week, and it is also determined that this three calls in the last week is far above Hank's average number of 1.3 calls per quarter over the five year period for which data regarding Hank's calls is available. It is also determined that Hank is a Platinum member, which could be a stipulated attribute or could be derived from experiential data regarding transactions previously initiated by Hank. In other examples, Hank's own experience may be compared to experiential data regarding other transaction initiators, such as comparing Hank's three calls in the last week to an average number of calls for Platinum customers.

Next, a routing for Hank's present call is determined based on one or more routing rules as evaluated in view of experiential data regarding transactions initiated by Hank and further in view of experiential data regarding transactions previously handled by customer service agents. In this specific example, one of the routing rules is:

"If customer is Platinum and call frequency>2*average call frequency, then route to an agent in the $95^{th}$ percentile for call resolution in the last 60 days."

The percentile for call resolution is a characteristic associated with customer service agents as represented by the experiential data regarding transactions previously handled by customer service agents. For example, call resolution may be a performance measure of the agents in the call centers that measures what percentage of calls that a given agent has handled were not followed by subsequent calls from the same customer about a same type of issue within a specified time period.

Returning to the Hank Ferguson example, it is determined by processing experiential data regarding transactions previously handled by customer service agents that, based on call handling facts for the last 60 days, Lori would rank 25th in a center of one thousand agents—well within the top 5% of her peers for this measure. Based on the rule, and the processing of the experiential data regarding transactions previously initiated by Hank Ferguson, the present call initiated by Hank is routed to Lori for handling.

Having provided an illustrative example, we now describe a system in which experiential data regarding past transactions is used to automatically and dynamically inform evaluation of routing rules, to optimize the routing of a particular incipient transaction (initiated by a transaction initiator) to an organizational entity. Such a system is schematically illustrated in FIG. 1.

Referring now to FIG. 1, an incipient transaction 102 (such as the call from Hank Ferguson, discussed above), originated by a transaction initiator 101, is provided to a router 104. As will be discussed in greater detail, the router 104 is configured to make a routing determination 110 based on experiential data in a fact collection 108 to cause the router to route the incipient transaction to a particular organizational entity for handling.

Referring again to the Hank Ferguson example, the routing determination may include determining that Hank is a Platinum customer (whether based on stipulated data or on experiential data regarding past transactions initiated by Hank, or a combination of both) and, further, determining based on experiential data of transactions previously initiated by Hank, in the fact collection, that: Hank has called three times in the last week, and the three calls in the last week is far above Hank's average number of 1.3 calls per quarter over the five year period for which data regarding Hank's calls is available.

Continuing still with the Hank Ferguson example, with reference to the customer service agents, the routing determination may further include determining, based on experiential data of the customer service agents, that Lori is within the top 5% of her peers for call resolution in the last 60 days.

The experiential data regarding the initiator of the incipient transaction (e.g., the experiential data regarding Hank) and experiential data regarding transactions handled by organization entities are processed in view of routing rules to make the routing determination. The routing determination 110 is provided to the router 104, which causes the incipient transaction to be provided for transaction handling 112 to a particular organizational entity corresponding to the routing determination, for completion of the transaction. Furthermore, experiential data with respect to the completion of the transaction (114) is collected and fed back to the fact collection 108. In this way, for subsequent incipient transactions, the experiential data regarding the initiator of an incipient transaction and the experiential data regarding transactions handled by organizational entities, includes data with respect to completion of the transaction.

Figure 2:
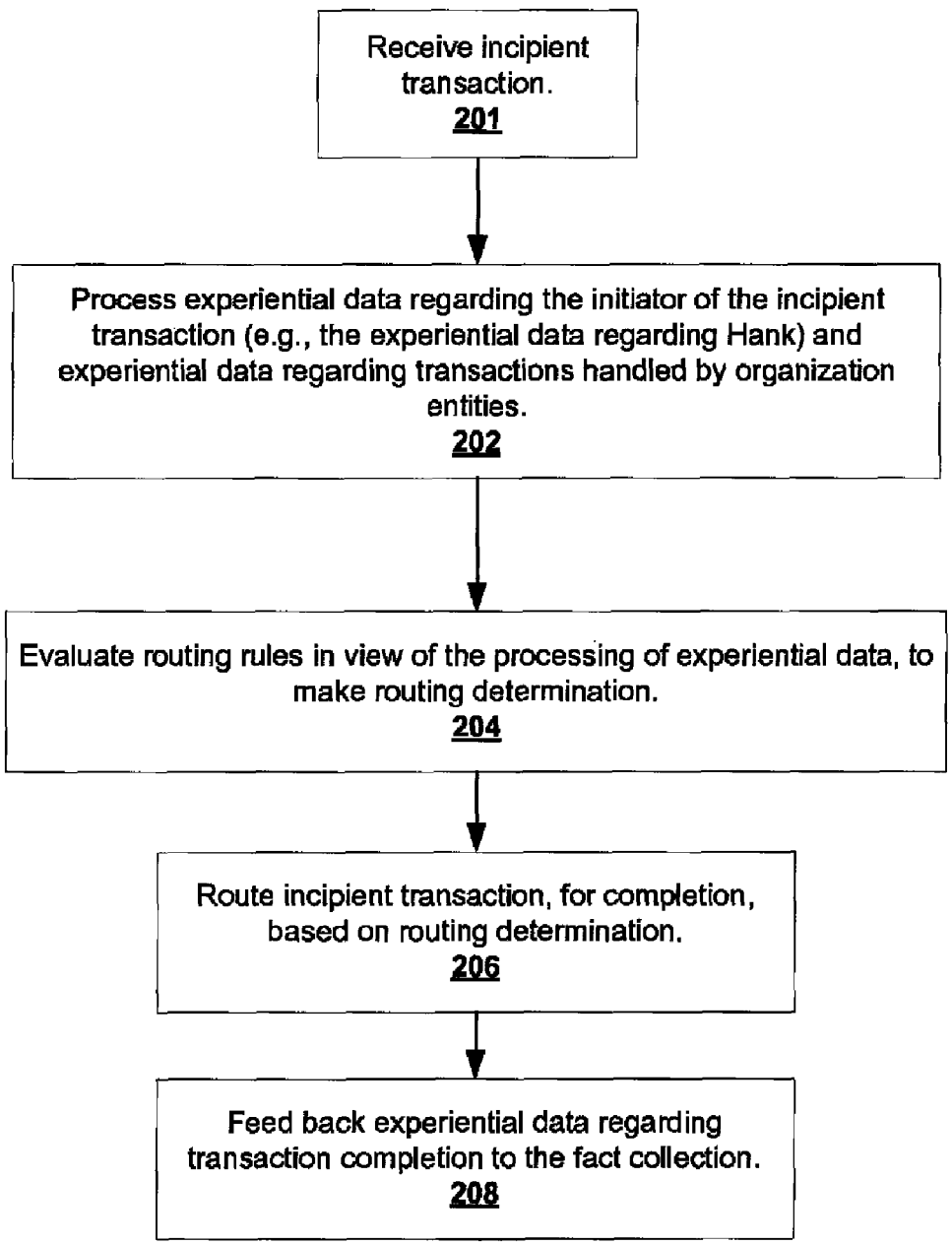
FIG. 2 is a flowchart illustrating a method of routing determination of a transaction.

Having described a system architecture, we now describe a method of routing determination with reference to the flowchart in FIG. 2. At 201, an incipient transaction is received. For example, the incipient transaction may be a received phone call such as phone call received from Hank Ferguson. At 202, the experiential data regarding the initiator of the incipient transaction and experiential data regarding transactions handled by organizational entities are processed. This may include, for example, aggregating data, computing a balanced score, unfettering, disambiguating, or other processing (and not to be construed as limiting to dimensionally-modeled fact collection).

At 204, routing rules are evaluated in view of the processing of experiential data, to make a routing determination to route the incipient transaction, for completion, to an organizational entity. At 206, the incipient transaction is routed according to the routing determination. At 208, experiential data of completion of the incipient transaction is fed back to the fact collection.

We have provided a basic description of a system and process by which incipient incoming transactions may be routed to an organization entity according to routing rules evaluated based on experiential data of an initiator of the incipient transaction as well as experiential data of organizational entities. We now describe some details according to some examples.

In one example, processing of experiential data (such as in 202 of the FIG. 2 flowchart) may be carried out as background processing, such as periodically, when computing resources are available, upon occurrence of particular events, or otherwise. However, where the routing rules are intended to be based on "up to the minute" experiential data (such as, for example, experiential data regarding call agent performance within the last five minutes), then the processing of experiential data is generally more synchronized to the use of such data and/or, while carried out asynchronously to the use of such data, is carried out relatively often.

As another example, the routing rules themselves need not be static. Rather, the routing rules may be dynamically configured to, for example, react to the experiential data. As one example, a routing rules may be dynamically configured to "raise the bar" for a particular call agent such as, for example, to gradually increase the difficulty of calls to be handled by particular agents (where, for example, the "difficulty" of a particular call is determined from experiential data regarding an initiator of that call).

We now discuss some examples of how the experiential data may be processed. In some examples, the experiential data are facts in a dimensionally-modeled fact collection (i.e., facts of or derived from a collection of facts organized as, or otherwise accessible according to, a dimensional data model). Thus, for example, the experiential data may be processed in a temporally-aware way.

For example, the processing of experiential data may result in an evaluative score, such as is described in U.S. patent Ser. No. 11/860,275 ("the '275 application"), filed on Sep. 24, 2007, and assigned to the assignee of the present invention. The '275 application is incorporated by reference herein in its entirety. The '275 application describes, for example, determining an evaluative score in a way that is temporally-aware, such as recognizing and accounting for the phenomena of slowly changing dimensions in the process of evaluating facts of or derived from a dimensionally-modeled fact collection. More particularly, the processing to determine an evaluative score may include processing the temporal relationship of finer grain values to coarser grain values for the dimension coordinates.

For example, in determining an evaluative score, processing may include disambiguation similar to that described in U.S. patent application Ser. No. 11/615,694 ("the '694 application"), filed on Dec. 22, 2006, and assigned to the assignee of the present application. The '694 application is incorporated by reference herein in its entirety. More particularly, the disambiguation may include, for example, remapping the correspondence of fine-grained entities to coarser-grained entities, of dimension coordinates resulting from a performance parameter portion of an evaluative query, such that each fine-grained entity maps to only one of the coarser-grained entities.

As another example, in determining an evaluative score, processing may include unfettering similar to that described in described in U.S. patent application Ser. No. 11/552,394 ("the '394 application"), filed on Oct. 24, 2006, and assigned to the assignee of the present application. The '394 application is incorporated by reference herein in its entirety. More specifically, the '394 application describes that unfettering may be accomplished, for example, by (at least conceptually) re-expressing a constraint in a performance fact portion of an evaluative query in terms of finer-grained entities of dimension coordinates satisfying an original, coarser-grained constraint.

Furthermore, while much of the description has been regarding call center operations, where the incipient transactions are calls from human users and the organizational entities are customer service agents, other examples need not be so limited. For example, an incipient transaction may be an automatic stock trade request, and the organizational entities may be various fulfillment services. The experiential data include facts related to portfolio value, level of trading activity, monetary costs related to using the various fulfillment services, and reliability with which the various fulfillment services have performed for trades having various characteristics.

What is claimed is:

1. A computer implemented method of making a routing determination that is usable to route a received incipient transaction to an organizational entity, comprising:
   processing, in a temporally-aware way, experiential data of a dimensionally-modeled fact collection regarding past transactions, upon receiving an incipient transaction, wherein the incipient transaction is a telephone call currently arriving at a call router, wherein the experiential data comprises experiential data regarding past transactions involving an initiator of the incipient transaction and experiential data of organizational entities regarding past transactions handled by the organizational entities, wherein processing of the experimental data regarding transactions handled by the organizational entities includes determining call resolution data that measures what percentage of calls that a given organizational entity has handled were not followed by subsequent calls from the same customer about the same type of issue within a specific time period as a performance measure for each of at least some of the organizational entities;
   automatically determining a category of the initiator; automatically determining call frequency change for the initiator defined as frequency of telephone calls made by the initiator at a latest predetermined period of time relative to an average call frequency;
   automatically choosing a routing rule from a plurality of routing rules based on the category of the initiator and the call frequency change for the initiator, wherein the routing rule determines a criterion for routing based on a predetermined percentile for call resolution; and
   routing the telephone call to one of the organizational entities that has a percentile for call resolution that satisfies the chosen routing rule,
   wherein processing the experiential data comprises re-expressing a constraint in a performance fact portion of an evaluative query in terms of finer-grained entities of dimension coordinates satisfying an original, coarser-grained constraint.

2. The method of claim 1, further comprising:
   dynamically configuring the routing rule to gradually increase the difficulty of calls routed to a given organizational entity based on experiential data regarding past transactions.

3. The method of claim 1, further comprising:
   providing, to the fact collection, experiential data regarding completion of the incipient transaction.

4. The method of claim 1, further comprising:
   processing the experiential data to dynamically configure at least one of the at least one routing rule.

5. The method of claim 1, wherein:
   processing the experiential data of past transactions is at least partially synchronous to receiving the incipient transaction.

6. The method of claim 1, wherein:
   processing the experiential data of past transactions is at least partially asynchronous to receiving the incipient transaction.

7. A transaction routing determining system comprising:
   at least one computing device, configured to make a routing determination that is usable to route a received incipient transaction to an organizational entity, the at least one computing device configured to:
   process, in a temporally-aware way, experiential data of a dimensionally-modeled fact collection regarding past transactions upon receiving an incipient transaction, wherein the incipient transaction is a telephone call currently arriving at a call router, the experiential data comprises experiential data regarding past transactions involving an initiator of the incipient transaction and experiential data regarding transactions handled by organizational entities, wherein the experimental data regarding transactions handled by the organizational entities includes call resolution data that measures what percentage of calls that a given organizational entity has handled were not followed by subsequent calls from the same customer about the same type of issue within a specific time period as a performance measure for each of at least some of the organizational entities, wherein the at least one computing device is configured to process the experiential data by re-expressing a constraint in a performance fact portion of an evaluative query in terms of finer-grained entities of dimension coordinates satisfying an original, coarser-grained constraint;
   automatically determine a category of the initiator;
   automatically determine call frequency change for the initiator defined as frequency of telephone calls made by the initiator at a latest predetermined period of time relative to an average call frequency; and
   automatically choose a routing rule from a plurality of routing rules based on the category of the initiator and the call frequency change for the initiator, wherein the routing rule determines a criterion for routing based on a predetermined percentile for call resolution; and
   a router to route the telephone call to one of the organizational entities that has a percentile for call resolution that satisfies the chosen routing rule.

8. The system of claim 7, wherein the at least one computing device is further configured to:
   dynamically configure the routing rule to gradually increase the difficulty of calls routed to a given organizational entity based on experiential data regarding past transactions.

9. The system of claim 7, wherein the at least one computing device is further configured to:
   provide, to the fact collection, experiential data regarding completion of the incipient transaction.

10. The system of claim 7, wherein the at least one computing device is further configured to:
    process the experiential data to dynamically configure at least one of the at least one routing rule.

11. The system of claim 7, wherein:
    the at least one computing device is configured such that processing the experiential data of past transactions is at least partially synchronous to receiving the incipient transaction.

12. The system of claim 7, wherein:
    the at least one computing device is configured such that processing the experiential data of past transactions is at least partially asynchronous to receiving the incipient transaction.

* * * * *